United States Patent
Kyusojin

(10) Patent No.: US 8,214,552 B2
(45) Date of Patent: Jul. 3, 2012

(54) TRANSMISSION APPARATUS, TRANSMISSION METHOD, COMMUNICATION APPARATUS, AND PROGRAM

(75) Inventor: Hiroshi Kyusojin, Tokyo (JP)

(73) Assignee: Sony Corporation, Tokyo (JP)

( * ) Notice: Subject to any disclaimer, the term of this patent is extended or adjusted under 35 U.S.C. 154(b) by 954 days.

(21) Appl. No.: 11/971,509

(22) Filed: Jan. 9, 2008

(65) Prior Publication Data
US 2009/0110110 A1    Apr. 30, 2009

(30) Foreign Application Priority Data
Jan. 11, 2007    (JP) .................. 2007-003582

(51) Int. Cl.
G06F 13/28    (2006.01)
G06F 3/00    (2006.01)
(52) U.S. Cl. .......................... 710/22; 710/56
(58) Field of Classification Search ............ 710/22, 710/56
See application file for complete search history.

(56) References Cited

U.S. PATENT DOCUMENTS

| | | | |
|---|---|---|---|
| 5,859,837 A | 1/1999 | Crayford | |
| 7,305,492 B2 * | 12/2007 | Bryers et al. .......... | 709/249 |
| 2003/0135678 A1 * | 7/2003 | Andre ................. | 710/243 |
| 2004/0218531 A1 * | 11/2004 | Cherian et al. ......... | 370/235 |
| 2006/0031607 A1 * | 2/2006 | Berreth ................. | 710/52 |
| 2007/0106813 A1 * | 5/2007 | Bordes et al. .......... | 709/231 |
| 2008/0005405 A1 * | 1/2008 | Innis et al. ............. | 710/56 |

FOREIGN PATENT DOCUMENTS

| | | |
|---|---|---|
| JP | 11-506287 | 8/1999 |
| JP | 2002-84339 | 3/2002 |
| JP | 2002-353979 | 12/2002 |
| JP | 2004-159203 | 6/2004 |
| JP | 2005-44047 | 2/2005 |
| JP | 2005-80063 | 3/2005 |
| JP | 2005-236447 | 9/2005 |
| JP | 2006-203639 | 8/2006 |
| JP | 2006-293799 | 10/2006 |

\* cited by examiner

*Primary Examiner* — Hyun Nam
(74) *Attorney, Agent, or Firm* — Finnegan, Henderson, Farabow, Garrett & Dunner, L.L.P.

(57) ABSTRACT

A transmission apparatus includes a memory adapted to store data to be transmitted, a transmission unit adapted to transmit, via a network, the data to be transmitted to a destination apparatus connected to the network, and a first rate controller adapted to control a first rate such that when the data to be transmitted having a size greater than the capacity of a transmission buffer of the transmission unit is transferred from the memory to the transmission buffer, the first rate at which the data is transferred from the memory to the transmission buffer is controlled to restrict the amount of data to be transmitted stored in the transmission buffer.

19 Claims, 11 Drawing Sheets

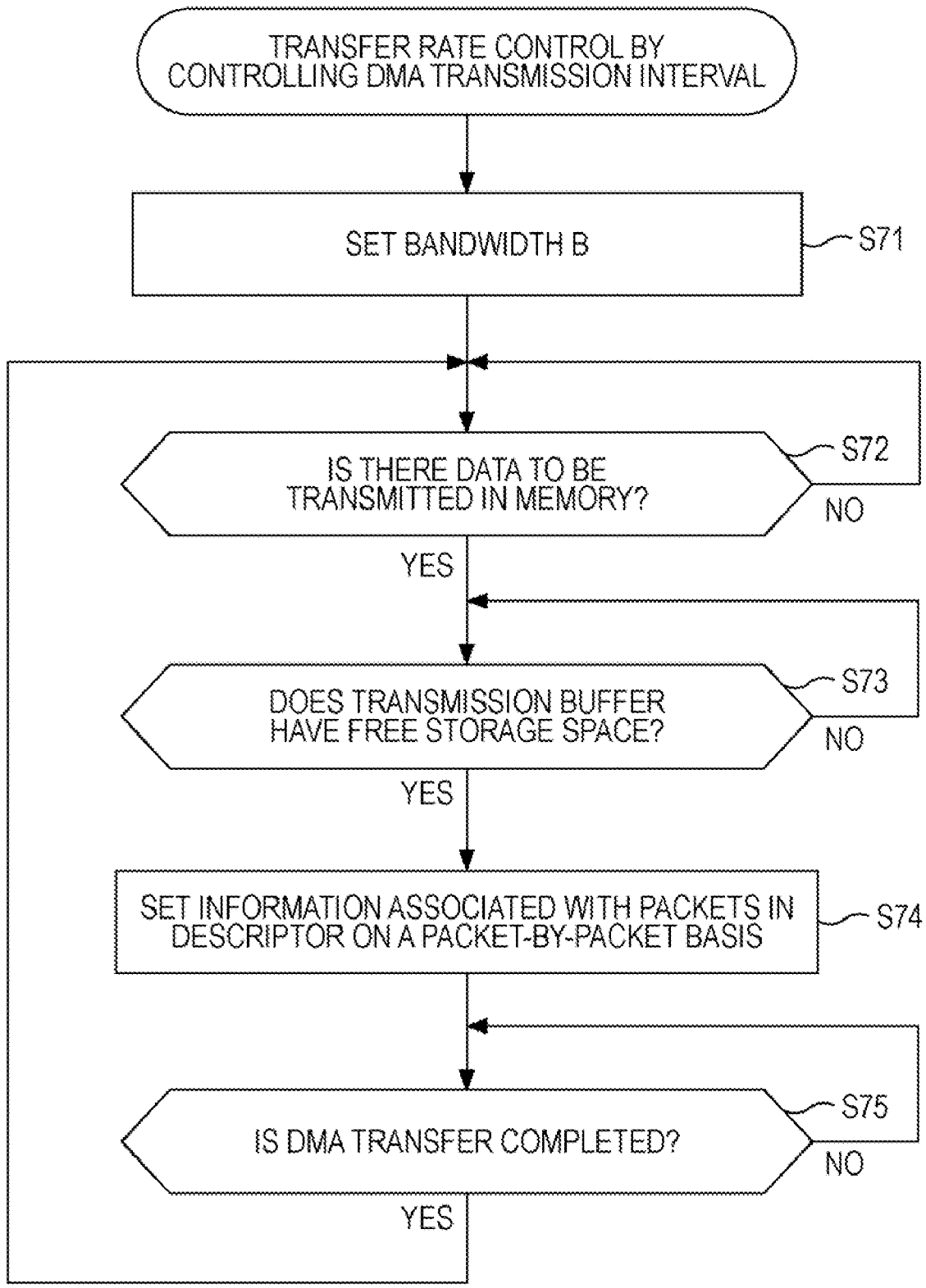

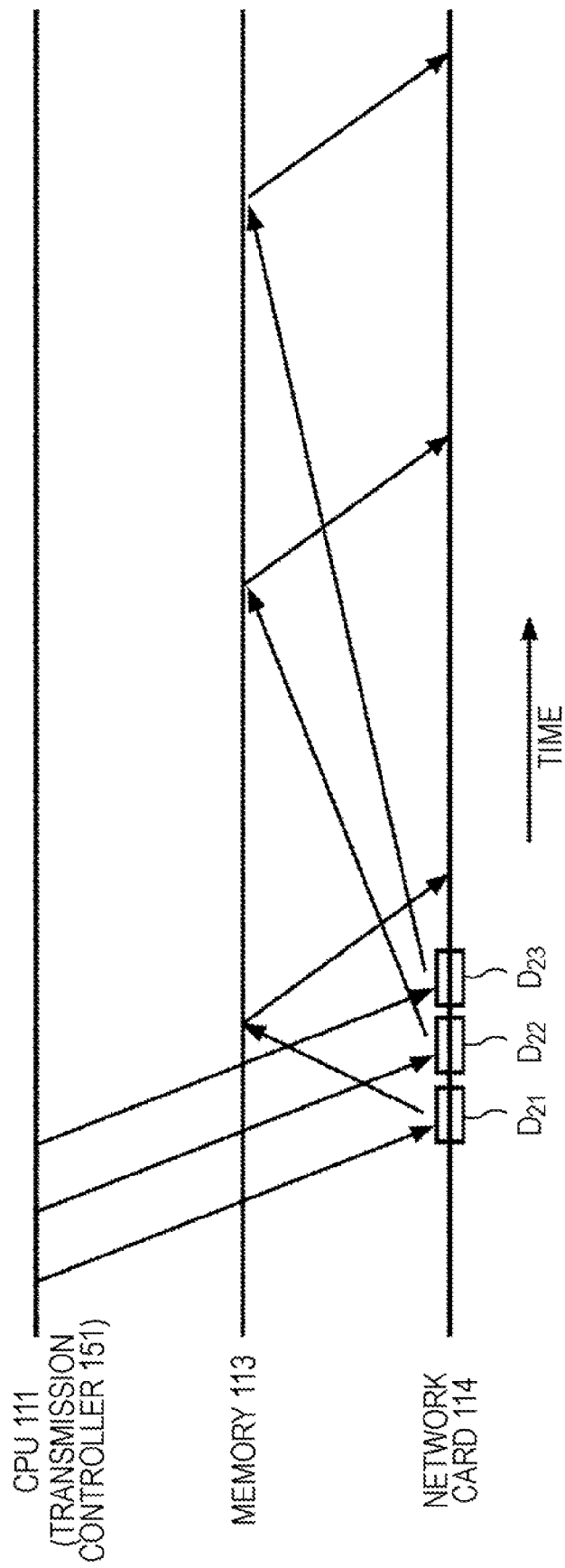

TRANSMISSION APPARATUS, TRANSMISSION METHOD, COMMUNICATION APPARATUS, AND PROGRAM

CROSS REFERENCES TO RELATED APPLICATIONS

The present invention contains subject matter related to Japanese Patent Application JP 2007-003582 filed in the Japanese Patent Office on Jan. 11, 2007, the entire contents of which are incorporated herein by reference.

BACKGROUND OF THE INVENTION

The present invention relates to a transmission apparatus, a transmission method, a communication apparatus, and a program, and more particularly, to a transmission apparatus, a transmission method, a communication apparatus, and a program, capable of preventing an overflow from occurring in a buffer of a device provided for connection to a network.

DESCRIPTION OF THE RELATED ART

In recent years, very high speed data bus has become available. For example, in a case where a data bus according to the ×8 (8 lanes) PCI Express standard is connected to a 10 Gbps (Giga bit per second) network card, it is possible to transfer data at as high a rate as 16 Gbps (=2 Gbps×8 lanes).

FIG. 1 is a block diagram illustrating an example of a configuration of a communication apparatus having such a high-speed data bus. In the example shown in FIG. 1, a communication apparatus 1 is adapted to communicate with a communication apparatus 3 having a similar configuration to the communication apparatus 1 via a network 2.

The communication apparatus 1 includes a CPU (Central Processing Unit) 11 adapted to execute a program to control operations of various parts of the communication apparatus 1, a memory 13 connected to the CPU 11 via a data bus 12, and a network card 14. The network card 14 includes a transmission buffer 21 adapted to store data to be transmitted to the communication apparatus 3, and a reception buffer 22 adapted to store data received from the communication apparatus 3.

FIG. 2 is a diagram provided for explanation of communication performed between the communication apparatus 1 and the communication apparatus 3. In FIG. 2, a transmission data bus and a reception data bus correspond to the data bus 12 in FIG. 1, and a transmission network card and a reception network card correspond to the network card 14 in FIG. 1. A transmission buffer corresponds to the transmission buffer 21 in FIG. 1, and a reception buffer corresponds to the reception buffer 22 in FIG. 1.

A transmission application and a reception application are executed by the CPU 11 of the communication apparatus 1 and that of the communication apparatus 3. Rectangles in FIG. 2 denote data to be transmitted, generated by the transmission application.

In the communication apparatus 1, as shown in FIG. 2, in a case where packets including data to be transmitted are transmitted by the transmission application executed by the CPU 11, data to be transmitted is read from the memory 13 by a DMA (Direct Memory Access) scheme so that the CPU 11 is not devoted to the data transmission operation, and the data is transferred to the transmission buffer of the transmission network card via the transmission data bus. Thereafter, the data is then transmitted in the form of packets from the transmission network card to the communication apparatus 3 via the network 2.

In the case of the data bus 12 with 8 lanes according to the PCI Express standard, the data bus 12 has the bandwidth of 16 Gbps. Therefore, if the network card 14 has a bandwidth of, for example, 10 Gbps, the transmission data bus 12 has a greater bandwidth than the transmission network card 14 has. The result of this is that if data is DMA-transferred from a transmission application (the memory 13) to the transmission buffer 21 at as high a transfer rate as the maximum available transfer rate (16 Gbps) of the transmission data bus 12, an overflow of data from the transmission buffer 21 of the transmission network card 14 occurs, even if packets carrying data to be transmitted are transmitted to the network 2 at the highest available transmission rate.

To avoid the above problem, the communication apparatus 1 determines whether the transmission buffer 21 of the network card 14 has a free storage space, and, if it is determined that the transmission buffer 21 has a free storage space, the communication apparatus 1 transmits the data to the transmission buffer 21 from the memory 13 by the DMA scheme. Next, referring to a flow chart shown in FIG. 3, explained is the process of transferring the data to be transmitted stored in the memory 13 by DMA to the transmission buffer 21.

In step S11, the CPU 11 determines whether there is data to be transmitted in the memory 13. In a case where it is determined in step S11 that the memory 13 has no data to be transmitted supplied by the transmission application executed by the CPU 11, the processing flow returns to step S11 to repeat the above-described process.

On the other hand, in a case where it is determined in step S11 that there is data to be transmitted in the memory 13, then, in step S12, the CPU 11 determines whether the transmission buffer 21 has a free storage space. In a case where the determination in step S12 is that the transmission buffer 21 does not have a free storage space, the processing flow returns to step S12 to repeat the above-described process.

On the other hand, if the determination in step S12 is that the transmission buffer 21 has a free storage space, the processing flow proceeds to step S13. In step S13, the CPU 11 sets information associated with the data to be transmitted on a packet-by-packet basis in a descriptor in the network card 14 (the memory 13).

Thereafter, data is transferred between the memory 13 and the network card 14 by the DMA scheme. As a result, the data to be transmitted stored in the memory 13 is transferred (copied) to the transmission buffer 21 packet by packet. The network card 14 then transmits the packets to the communication apparatus 3 via the network 2.

That is, the DMA transfer is performed if and only if it is determined in steps S11 and S12 that there is data to be transmitted in the memory 13 and the transmission buffer 21 has a free storage space, thereby ensuring that packets carrying data to be transmitted are prevented from overflowing from the transmission buffer 21.

The process then returns to step S11 to perform the process from steps S11 to S13 repeatedly until the transmission process in the DMA scheme by the transmission application is completed.

In the communication apparatus 1 according to the related technique, as described above, overflowing of data to be transmitted from the transmission buffer 21 is prevented by performing the data transmission in the DMA scheme only when the transmission buffer 21 has a free storage space.

Referring again to FIG. 2, in the communication apparatus 3, when the data in the form of packets transmitted from the communication apparatus 1 is received, the receiving process is reverse to the transmission process performed by the communication apparatus 1. That is, if the reception network card (the network card 14) receives a packet via the network 2, the received packet is temporarily stored in the reception buffer, and then transferred from the reception buffer to the reception application (memory 13) via the reception data bus by the DMA scheme. The received data (stored in the memory 13) is then processed by the reception application.

The communication between the communication apparatus 1 and the communication apparatus 3 is performed via the network 2 in the above-described manner.

Examples of techniques to control the flow of data depending on the bandwidth or depending on the transmission priority may be found, for example, in Japanese Unexamined Patent Application Publication No. 2002-353979 or PCT Japanese Translation Patent Publication No. 11-506287.

In the technique disclosed in Japanese Unexamined Patent Application Publication No. 2002-353979, the bandwidth used in transmission of data is controlled by repeatedly performing adjustment using pause frames as to disabling and enabling of transmission of packets from a transmission terminal.

In the technique disclosed in PCT Japanese Translation Patent Publication No. 11-506287, priority levels are assigned to respective ports of an Ethernet switch, and, when a situation occurs in which a pause frame has to be transmitted, the transmission of the pause frame is performed in accordance with the priority levels assigned to the ports.

SUMMARY OF THE INVENTION

In the communication apparatus 1 shown in FIG. 1, when the transmission buffer 21 becomes full and there is no more free storage space, the DMA transfer is interrupted until the transmission buffer 21 again has a free storage space. The CPU 11 has to have a capability of detecting that a free storage space has been created in the transmission buffer 21, for example, by receiving a notification interrupt from the network card 14 or by checking the status of the network card 14 by polling. However, this needs a complicated program in the DMA process.

Another problem of this technique is that a greater CPU time is needed to transmit data than is needed in the case where no overflow occurs in the transmission buffer 21.

In the technique disclosed in Japanese Unexamined Patent Application Publication No. 2002-353979 and in the technique disclosed in PCT Japanese Translation Patent Publication No. 11-506287, the bandwidth or the transmission priority is controlled by controlling the flow of data. However, the frequency of controlling the flow of data is not reduced by these techniques.

In view of the above, it is desirable to provide a technique to prevent an overflow from occurring in a device provided for connection to a network, without imposing a large processing load on a CPU.

According to an embodiment of the present invention, there is provided a transmission apparatus including a memory adapted to store data to be transmitted, transmission means for transmitting, via a network, the data to be transmitted to a destination apparatus connected to the network, and first rate control means for controlling a first rate such that when the data to be transmitted having a size greater than the capacity of a transmission buffer of the transmission means is transferred from the memory to the transmission buffer, the first rate at which the data is transferred from the memory to the transmission buffer is controlled to restrict the amount of data to be transmitted stored in the transmission buffer.

The network refers to a mechanism of transmitting information between apparatuses connected to the network. The apparatuses which communicate with each other via the network may be apparatuses disposed separately or may be internal blocks disposed in a single apparatus.

The communication may be performed wirelessly or via a wire, or may be performed via a communication line including a mixture of wireless and wired lines. That is, the communication may be performed wirelessly in a certain zone but via a wire in another zone. The communication may also be performed in such a manner that information is transmitted from one apparatus to another apparatus via a wire, and further transmitted therefrom to further another apparatus wirelessly.

The data to be transmitted may be transferred from the memory to the transmission buffer by a DMA transfer scheme.

The first rate control means may control the first rate in such a manner that when a first bandwidth of a bus provided for connection between the memory and the transmission means is greater than a second bandwidth of the transmission means, first rate control means controls the first rate so that the first rate is lower than a second rate at which data is transmitted from the transmission means to the network.

The transmission apparatus may further include second rate control means for controlling the second rate such that when a notification indicating that a reception buffer of the destination apparatus has an overflow is received via the network, the second rate control means controls the second rate to restrict the amount of data to be transmitted.

The notification may be a pause frame according to the IEEE (The Institute of Electrical and Electronic Engineers) 802.3x standard.

The second rate control means may control the second rate in such a manner that if a period specified by the pause frame has elapsed, or if a release frame according to the IEEE802.3x standard, indicating that a pause state caused by the pause frame is allowed to be released, is received from the destination apparatus via the network, the second rate control means controls the second rate to increase the amount of data transmitted.

The second rate control means may adjust the amount of data to be transmitted by AIMD (Additive Increase Multiple Decrease).

The first rate control means may control the first rate by controlling the transfer interval in the DMA transfer operation.

According to an embodiment of the present invention, there is provided a method of transmitting data by a transmission apparatus including a memory adapted to store data to be transmitted, and transmission means for transmitting, via a network, the data to be transmitted to a destination apparatus connected to the network, the method including the step of controlling a first rate such that when the data to be transmitted having a size greater than the capacity of a transmission buffer of the transmission means is transferred from the memory to the transmission buffer, the first rate at which the data is transferred from the memory to the transmission buffer is controlled to restrict the amount of data to be transmitted stored in the transmission buffer.

According to an embodiment of the present invention, there is provided a program executable by a computer to perform a process in a transmission apparatus including a memory adapted to store data to be transmitted, and transmission means for transmitting, via a network, the data to be transmitted to a destination apparatus connected to the network, the process including the step of controlling a first rate such that when the data to be transmitted having a size greater than a capacity of the transmission buffer of the transmission means is transferred from the memory to the transmission buffer, the first rate at which the data is transferred from the memory to the transmission buffer is controlled to restrict the amount of data to be transmitted stored in the transmission buffer.

In the transmission apparatus described above, when the data to be transmitted having a size greater than the capacity of the transmission buffer of the transmission means is transferred from the memory to the transmission buffer, the first rate at which the data is transferred from the memory to the transmission buffer is controlled to restrict the amount of data to be transmitted stored in the transmission buffer.

According to an embodiment of the present invention, there is provided a communication apparatus including a transmission apparatus of the type described above, and reception means for receiving data transmitted from an apparatus via a network.

In this communication apparatus, data transmitted from an apparatus is received via a network. In the operation, when the data to be transmitted having a size greater than the capacity of the transmission buffer of the transmission means is transferred from the memory to the transmission buffer, the first rate at which the data is transferred from the memory to the transmission buffer is controlled to restrict the amount of data to be transmitted stored in the transmission buffer.

As described above, the present invention provides the great advantage that an overflow is prevented from occurring in a device provided for connection to a network, without imposing a large processing load on a CPU.

BRIEF DESCRIPTION OF THE DRAWINGS

FIG. 10 is a flow chart illustrating a process of controlling a transfer rate by controlling a DMA transmission interval; and FIG. 11 is a timing chart associated with a process of controlling a transfer rate by controlling a DMA transmission interval.

DESCRIPTION OF THE PREFERRED EMBODIMENTS

Before describing an embodiment of the present invention, the correspondence between the features of the invention and the specific elements disclosed in embodiments of the present invention is discussed below. This description is intended to assure that embodiments supporting the invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the invention, that does not necessarily mean that the element does not relate to other features of the invention.

Figure 5:
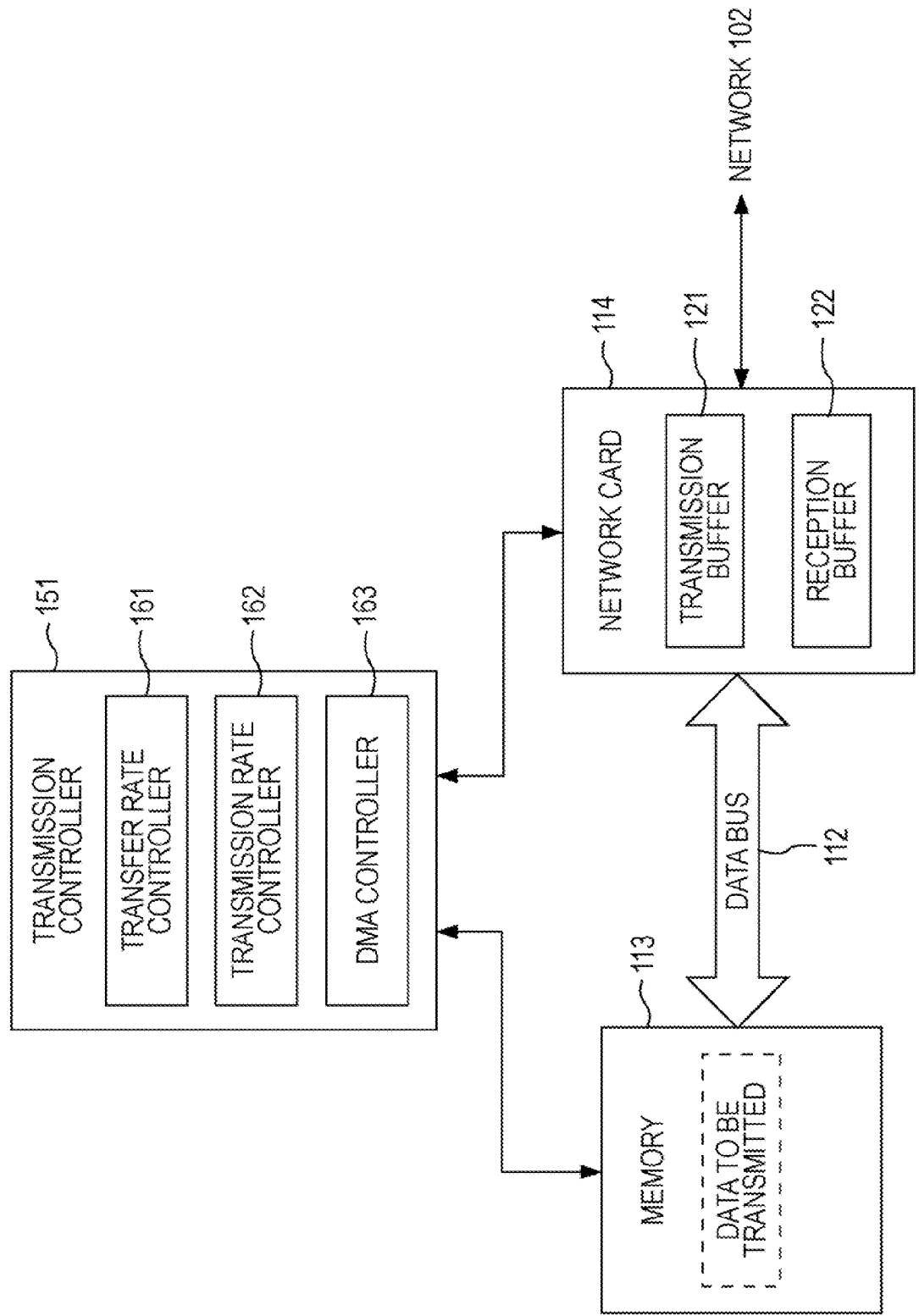
FIG. 5 is a diagram illustrating functional blocks realized by executing a program by a CPU.

A "memory" as a feature of the present invention corresponds to, for example, a memory 113 shown in FIG. 5 as a specific element. "Transmission means" corresponds to, for example, a network card 114 shown in FIG. 5. "First rate control means" corresponds to, for example, a transfer rate controller 161 shown in FIG. 5 adapted to control a "first rate (for example, a transfer rate)". "Second rate control means" corresponds to, for example, a transmission rate controller 162 shown in FIG. 5 adapted to control a "second rate (for example, a transmission)".

The present invention is described in further detail below with reference to embodiments in conjunction with the accompanying drawings.

Figure 1:
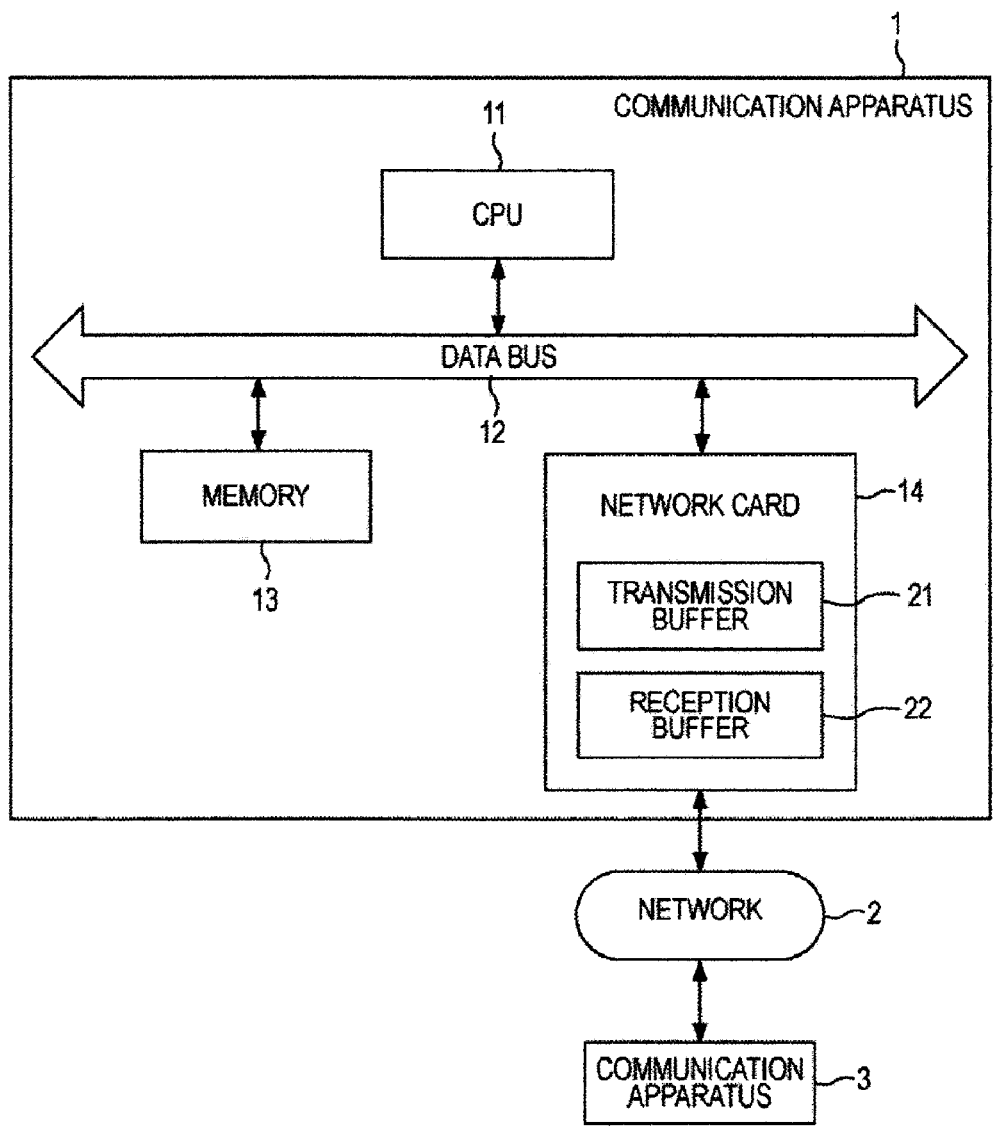
FIG. 1 is a block diagram showing an example of a configuration of a communication apparatus.
Figure 2:
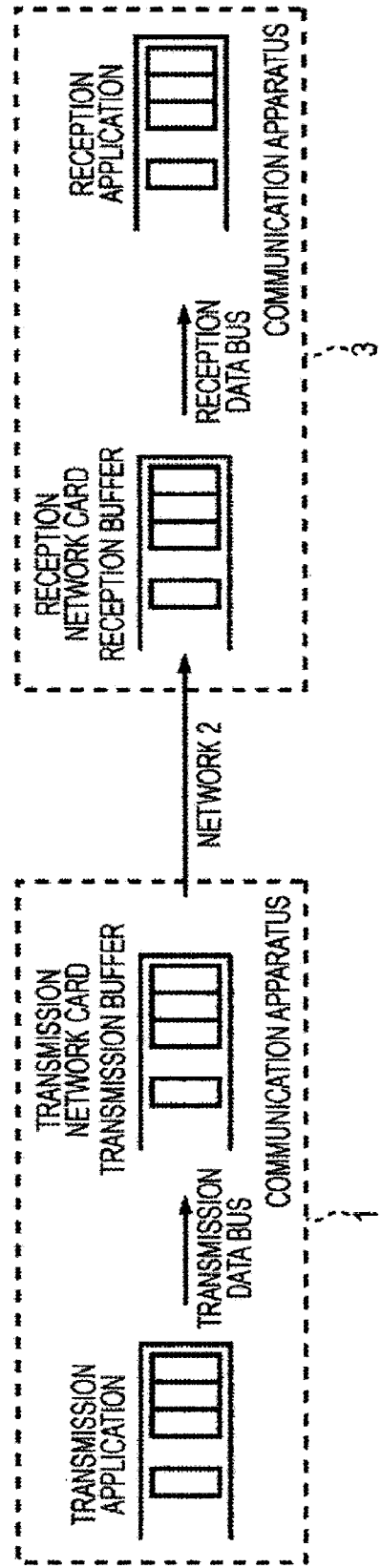
FIG. 2 is a diagram provided for explanation of communication performed between a communication apparatus and another communication apparatus.
Figure 3:
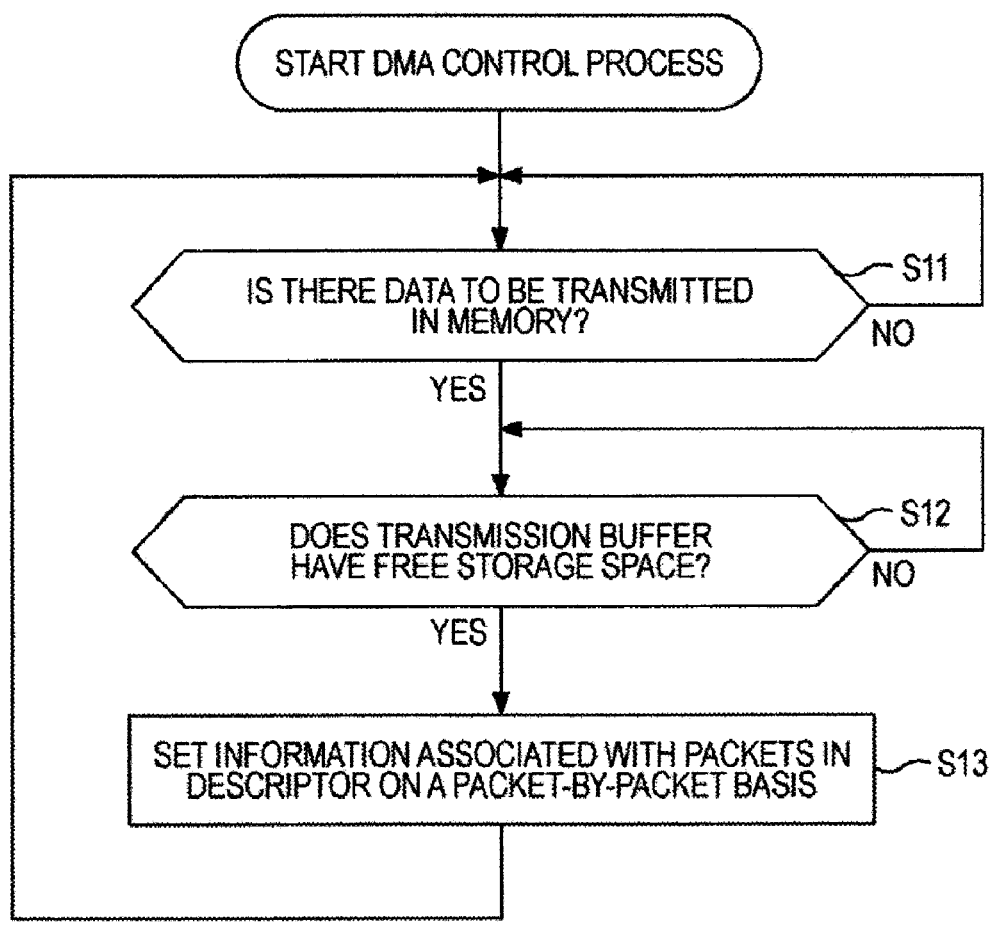
FIG. 3 is a flow chart provided for explanation of a DMA control process.
Figure 4:
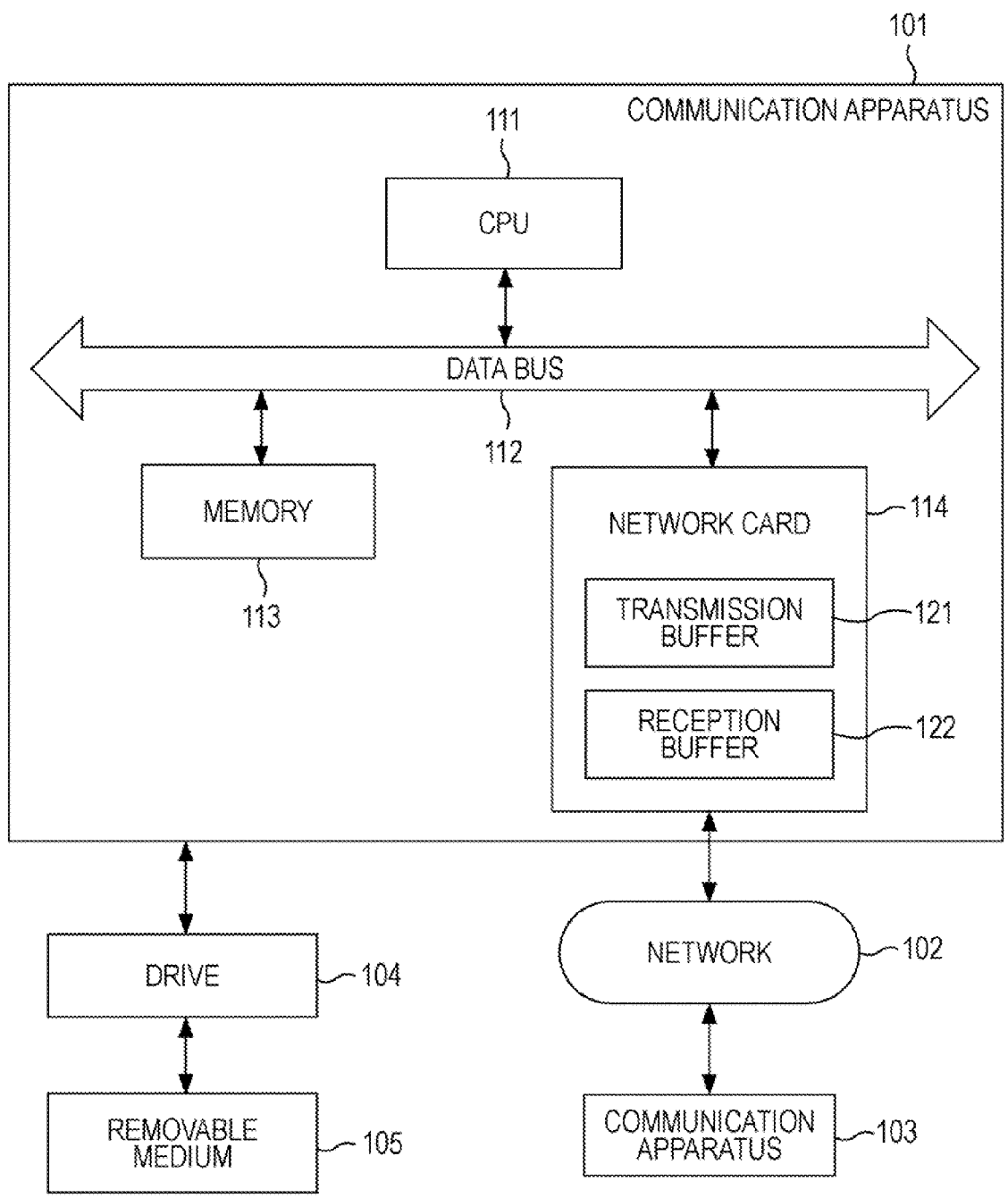
FIG. 4 is a block diagram illustrating an example of a configuration of a communication apparatus according to an embodiment of the present invention.

FIG. 4 is a block diagram showing an example of a configuration of a communication apparatus according to an embodiment of the present invention. This communication apparatus 101 is configured to transmit data stored in an internal memory 113 to a communication apparatus 103 via a network 102 while controlling the transmission rate. The communication apparatus 101 is also adapted to receive data transmitted from the communication apparatus 103 connected to the network 102.

In FIG. 4, the communication apparatus 103 is configured in a similar manner to the communication apparatus 101 so as to be capable of communicating with the communication apparatus 101 via the network, and thus a duplicated explanation of the configuration of the communication apparatus 103 is omitted.

The communication apparatus 101 includes a CPU 111, a memory 113, and a network card 114. These parts of the communication apparatus 101 are connected to each other via a data bus 112.

The CPU 111 is adapted to control operations of various parts of the communication apparatus 101. The CPU 111 realizes functional blocks shown in FIG. 5, which will be described later, by executing a program stored in the memory 113.

In the memory 113, programs (including a device driver for controlling the network card 114) executed by the CPU 111 are stored. The memory 113 is also used to store data to be transmitted and received data, as required.

The network card 114 is a device adapted to connect the communication apparatus 101 to the network 102. The network card 114 includes a transmission buffer 121 for storing data to be transmitted to the communication apparatus 103 via the network 102, and a reception buffer 122 for storing data received from the communication apparatus 103 in via the network 102.

The network card 114 acquires the data to be transmitted in units of packets from the memory 113 by the DMA scheme in accordance with a descriptor set by the CPU 111, and the network card 114 transmits the data to the communication apparatus 103 via the network 102.

A drive 104 is connected to the communication apparatus 101, as required. On the drive 104, a removable medium 105 such as a magnetic disk, an optical disk, a magneto-optical disk, or a semiconductor memory is mounted as required. The drive 104 reads a program stored in the removable medium 105 mounted On the drive 104, and supplies the read program to the CPU 111.

The network 102 is for transmitting data output from the communication apparatus 101 in the form of packets to the communication apparatus 103 within a specified delay time, and may be a transmission line such as a wireless transmission line, a wired transmission line, and/or the Internet, or a mixture thereof.

The communication apparatus 101 may include a memory controller adapted to control an operation of DMA-transferring data between the memory 113 and the network card 114.

FIG. 5 is a diagram illustrating functional blocks realized by the CPU 111 by executing a program. In FIG. 5, a data bus 112, a memory 113, and a network card 114 are similar to the data bus 112, the memory 113, and the network card 114 shown in FIG. 4, and thus a duplicated explanation thereof is omitted.

In the communication apparatus 101, the transmission controller 151 controls transmission of data to the communication apparatus 103 connected to the network 102.

The transmission controller 151 includes a transfer rate controller 161, a transmission rate controller 162, and a DMA controller 163.

The transfer rate controller 161 controls the transfer rate of the data bus 112 connected between the memory 113 and the network card 114.

The transmission rate controller 162 controls the transmission rate of data transmitted from the network card 114 over the network 102.

The DMA controller 163 sets information in the descriptor on a packet-by-packet basis thereby controlling DMA transfer of data between the memory 113 and the network card 114.

The information set in the descriptor associated with each packet includes, for example, the address of the memory 113 at which the packet is located (more specifically, a high-order 32-bit address and a low-order 32-bit address indicating the starting point of the data) and the packet size (for example, 16-bit data indicating the packet size), or data indicating the DMA transfer interval (or a delay time by which to adjust the DMA transfer interval).

Next, referring to a flow chart shown in FIG. 6, the process of controlling the transfer rate of the data bus 112, performed by the transmission controller 151, is described below.

In step S31, the transfer rate controller 161 sets a target bandwidth B and a target time Tn. More specifically, the transfer rate controller 161 sets the target bandwidth B to be equal to the bandwidth (for example, 10 Gbps) of the network card 114 (or the network 102), and sets the initial value of target time Tn to be equal to the current time.

In step S32, the transmission controller 151 determines whether there is data to be transmitted in the memory 113.

In a case where the determination in step S32 is that there is no data to be transmitted in the memory 113, the processing flow returns to step S32 to repeat step S32. More specifically, for example, the process of step S32 is performed repeatedly until data to be transmitted is stored in the memory 113 by the transmission application executed by the CPU 111 and thus it is determined in step S32 that there is data to be transmitted in the memory 113.

On the other hand, in a case where the determination in step S32 is that there is data to be transmitted in the memory 113, the processing flow proceeds to step S33. In step S33, the transmission controller 151 determines whether the transmission buffer 121 of the network card 114 has a free storage space.

In a case where the determination in step S33 is that the transmission buffer 121 has no free storage space, the processing flow returns to step S33 to repeat step S33. More specifically, for example, the process in step S33 is performed repeatedly until a packet carrying data to be transmitted stored in the transmission buffer 121 is transmitted from the network card 114 to the communication apparatus 103 via the network 102, and thus it is determined in step S33 that a free storage space is created in the transmission buffer 121.

On the other hand, in a case where the determination in step S33 is that the transmission buffer 121 has a free storage space, the process proceeds to step S34. In step S34, the transfer rate controller 161 sets the present time into the variable T to indicate the present time.

In step S35, the transfer rate controller 161 determines whether the current time T has reached the target time Tn.

In a case where the determination in step S35 is that the current time T has not yet reached the target time Tn, the process returns to step S34 to perform the process from S34 to S35 repeatedly until the current time T has reached the target time Tn.

On the other hand, if the determination in step S35 is that the current time T has reached the target time Tn, the processing flow proceeds to step S36. For example, in the present case, because the current time T is set in step S34 after the target time Tn set in step S31, the current time T has already reached the target time Tn, and thus, in step S36, the DMA controller 163 sets information in the descriptor associated with the corresponding packet.

More specifically, for example, the DMA controller 163 sets an address of the memory 113 assigned to the packet and information indicating the packet size in the descriptor of the network card 114 (memory 113).

Thus, in the network card 114, in accordance with the descriptor from the CPU 111, data to be transmitted is transferred on the packet-by-packet basis to the transmission buffer 121 by the DMA transfer scheme and is stored in the transmission buffer 121. The network card 114 transmits a packet carrying data to be transmitted to the communication apparatus 103 via the network 102.

In step S37, the transfer rate controller 161 calculates the target time Tn. More specifically, the transfer rate controller 161 calculates the target time Tn according to equation (1) shown below.

$$\text{target time } Tn = \text{current time } T + ((\text{packet size})/(\text{target bandwidth } B)) \quad (1)$$

For example, in a case where the network card 114 with a bandwidth of 10 Gbps continuously transmits packets with a size of 1,000 bytes, ((packet size)/(target bandwidth B)) is given as 1,000 (bytes)/10 (Gbps)=(8×1,000 (bits))/(10×1,000,000,000 (bits/sec))=8/10,000,000 (sec) =0.00000008=0.8 (μs). Thus, the target time Tn is set to be equal to the current time T plus 0.8 μs. On the other hand, in a case where a packet with a size of 100 bytes is transmitted, the target time Tn is set to be equal to the current time T plus 0.08 μs. For a packet with a size of 10,000 bytes is transmitted, the target time Tn is set to be equal to the current time T plus 8 μs.

The process then returns to step S32 to repeat the process from step S32 to S37, including determining whether the memory 113 has data to be transmitted supplied by the transmission application executed by the CPU 111, determining whether the transmission buffer 121 has a free storage space, determining whether the current time T has reached the target time Tn (set to be equal to, for example, the current time T+0.8 μs), and transferring the data to be transmitted by the packet-by-packet basis to the transmission buffer 121 by the DMA scheme.

That is, in the case where the data bus 112 has a bandwidth, for example, 16 Gbps, when data to be transmitted is transferred on the packet-by-packet basis from the memory 113 to the network card 114 via the data bus 112 by the DMA scheme, the bandwidth is set not to be greater than the bandwidth (10 Gbps) of the network card 114 which is smaller than the maximum allowable bandwidth (16 Gbps) of the data bus 112, thereby ensuring that the bandwidth of data being transmitted via the data bus 112 is controlled to be equal to or smaller than the bandwidth of the network card 114 and thus no overflow occurs in the transmission buffer 121 of the network card 114.

In the communication apparatus 101, the transfer rate of the data bus 112 is controlled in the above-described manner to prevent the transmission buffer 121 from having an overflow. In practice, depending on the state of the network 102, the network card 114 having a bandwidth 10 Gbps is not necessarily always capable of transmitting data at a rate of 10 Gbps over the network 102. However, the above-described control of the transfer rate of the data bus 112 prevents at least the overflow of data from the transmission buffer 121 in the communication apparatus 101.

Figure 6:
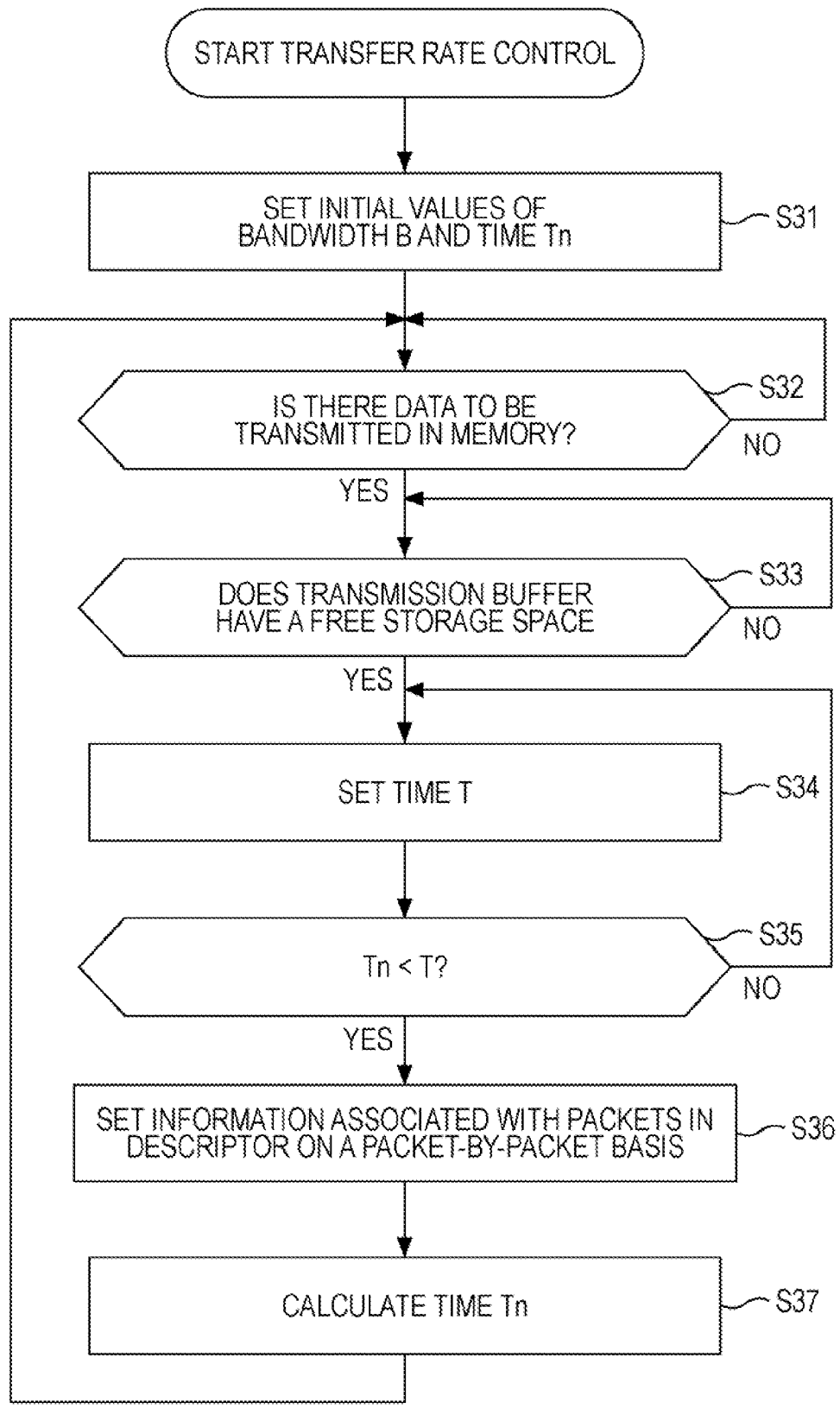
FIG. 6 is a flow chart illustrating a transfer rate control process.
Figure 7:
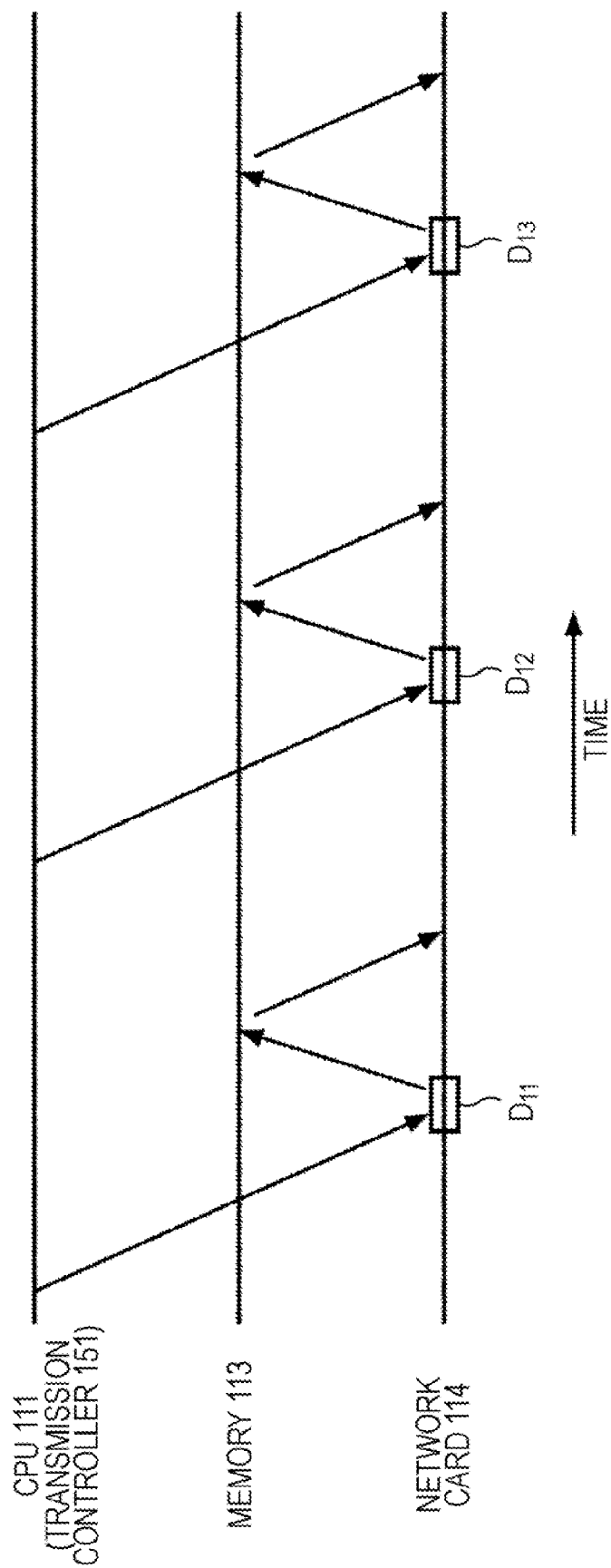
FIG. 7 is a timing chart of a transfer rate control process.

Next, referring to a timing chart shown in FIG. 7, an explanation is provided as to the operations of the CPU 111, the memory 113, and the network card 114 in the process of controlling the transfer rate of the data bus 112 shown in FIG. 6 under the control of the transmission controller 151 (i.e., the CPU 111).

In FIG. 7, a timing chart of the CPU 111 (the transmission controller 151) is shown on the top, a timing chart of the memory 113 in the middle, and a timing chart of the network card 114 on the bottom. In each timing chart in FIG. 7, a horizontal solid line represents time elapsing in a direction from left to right in FIG. 7.

For example, in step S36 in FIG. 6, if information is produced on the packet-by-packet basis to be set in the descriptor of the network card 114 by the DMA controller 163, then, as shown in FIG. 7, the CPU 111 sets the descriptor $D_{11}$ described for each packet of the data to be transmitted in the network card 114 via the data bus 112.

In the descriptor $D_{11}$, as described above, the address of the memory 113 at which the packet is located (more specifically, a high-order 32-bit address and a low-order 32-bit address indicating the starting point of the data), and the packet size (for example, 16-bit data indicating the packet size) are described.

In accordance with the information as to the address and the size of the packet described in the descriptor $D_{11}$, data starting from the point indicated by the address and having the specified length is read by the network card 114 from the memory 113 and transferred to the transmission buffer 121 by the DMA scheme. In response, the network card 114 transmits the received packet to the communication apparatus 103 via the network 102.

Thereafter, the process from step S32 to S37 in FIG. 6 is performed repeatedly. In this repetition of the process, when the transmission buffer 121 has a free storage space, if the memory 113 has data to be transmitted, then, at a time at which the current time T has reached the target time Tn (for example, the current time T+0.8 μs), the DMA controller 163 sets, in step S36 in FIG. 6, information associated with each packet in the descriptor, and, in response, the CPU 111 sets the descriptor $D_{12}$ in the network card 114 via the data bus 112 as shown in FIG. 7.

In accordance with the address and the size of the packet described in the descriptor $D_{12}$ in a similar manner to the descriptor $D_{11}$, the network card 114 transfers the packet carrying the data to be transmitted from the memory 113 to the transmission buffer 121 by the DMA scheme, and further transmits the packet to the communication apparatus 103 via the network 102.

Furthermore, in the repetition of the process from step S32 to S37 in FIG. 6, when information associated with each packet is set in the descriptor, in step S36 in FIG. 6, by the DMA controller 163, the CPU 111 sequentially sets the descriptors $D_{13}$ to $D_{1n}$ (where n is an interger (descriptor $D_{1n}$ is not shown in the figure)) in the network card 114 via the data bus 112 as shown in FIG. 7.

In accordance with the address and the size of the packet described in the descriptors $D_{13}$ to $D_{1n}$ in a similar manner to the descriptor $D_{11}$, the network card 114 transfers the packet carrying the data to be transmitted from the memory 113 to the transmission buffer 121 by the DMA scheme, and further transmits the packet to the communication apparatus 103 via the network 102.

As described above, the CPU 111 (the transmission controller 151) adjusts the timing of setting the information associated with packets in the descriptor on the packet-by-packet basis by performing a software process so as to adjust the intervals at which the DMA transfer is performed between the memory 113 and the transmission buffer 121 of the network card 114. Thus, in the communication apparatus 101, the adjustment of the transfer rate of the data bus 112 is adjusted to prevent the transmission buffer 121 from having an overflow.

In the communication apparatus 103 at the receiving end connected to the network 102, if a network card has a bandwidth of 10 Gbps and if this network card is connected to a ×4 (4 lanes) PCI Express data bus (having a total bandwidth of 8 Gbps (=2 Gbps×4 lanes)), the bandwidth (8 Gbps) of the reception data bus is smaller than the bandwidth (10 Gbps) of the reception network card. Thus, even when the data is supplied to the reception buffer of the reception network card at as high a rate as 10 Gbps, the transfer of the data from the reception buffer to the memory by the DMA scheme is performed at a lower rate of 8 Gbps, and thus the reception buffer has an overflow.

In this case, if the network card 114 at the receiving end is one satisfying specifications of the IEEE (The Institute of Electrical and Electronic Engineers) 802.3x standard, the network card 114 at the receiving end is capable of sending a pause frame to the network card 114 of the communication apparatus at the transmitting end to request the communication apparatus at the transmitting end to temporarily stop transmission of data for a specified period.

Figure 8:
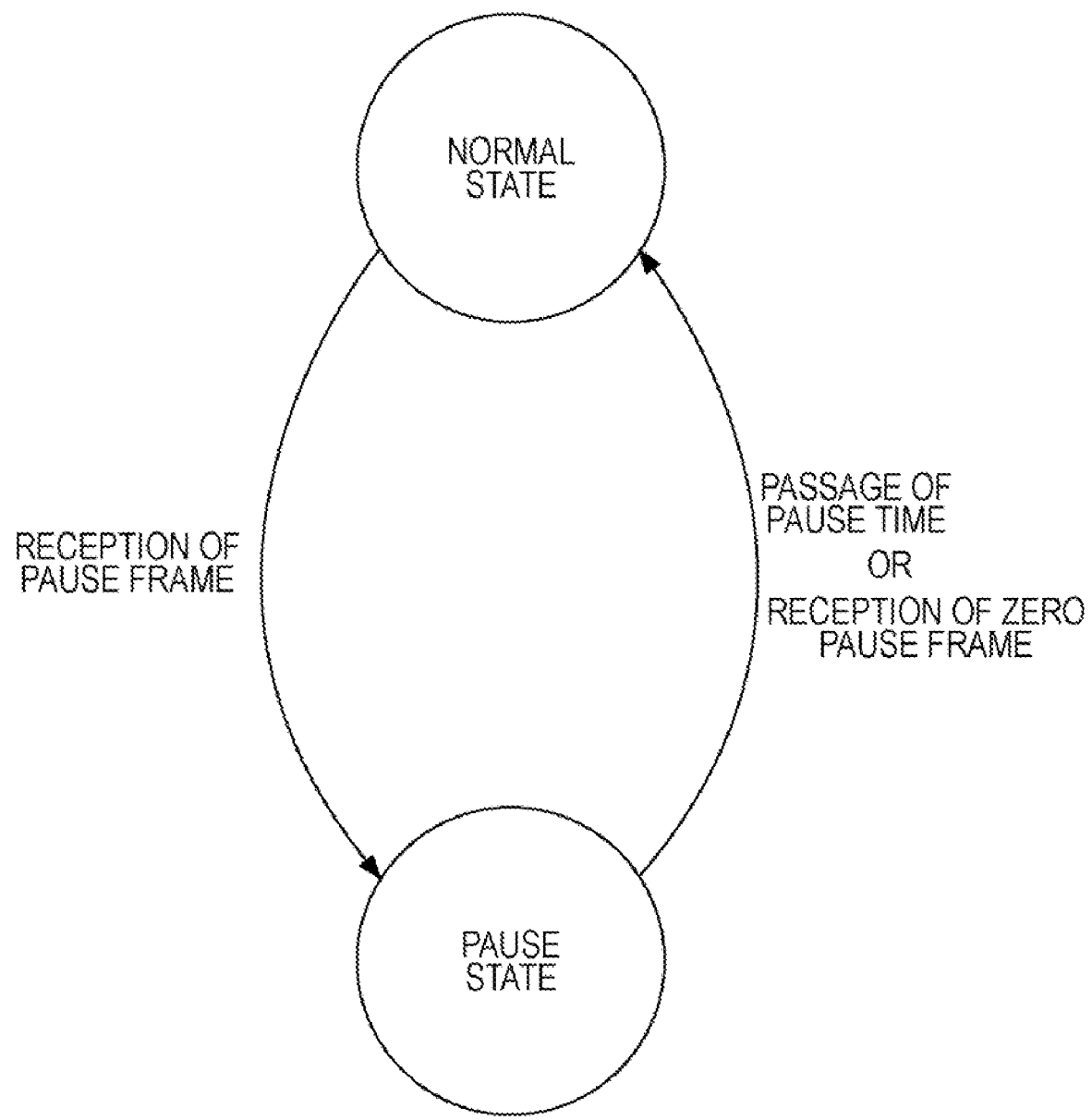
FIG. 8 is a diagram illustrating state transitions caused by pause frames.

More specifically, as shown in FIG. 8, when the network card 114 having the IEEE802.3x capability at the transmitting end is transmitting packets in a normal state, if a pause frame issued by the communication apparatus 103 at the receiving end is received via the network 102, the operation state of the network card 114 at the transmitting end changes into a pause state. Thereafter, if a pause time specified in the received pause frame has elapsed, or if a zero pause frame indicating that the pause can be cancelled is received via the network 102 from the communication apparatus 103 at the receiving end, the state of the network card 114 of the communication apparatus at the transmitting end returns to the normal mode.

That is, in response to receiving the pause frame from the communication apparatus 103 at the receiving end, the communication apparatus 101 at the transmitting end controls the transmission rate so that the communication apparatus 103 at the receiving end can successfully receive the data. This makes it possible to minimize the probability that the communication apparatus 103 at the receiving end should issue further pause frames thereafter, and thus it is possible to reduce the processing load which otherwise would be imposed on the communication apparatus 101 at the transmitting end. The process performed by the communication apparatus at the transmitting end to control the transmission rate in response to receiving the pause frame from the communication apparatus at the receiving end is described in further detail below.

Figure 9:
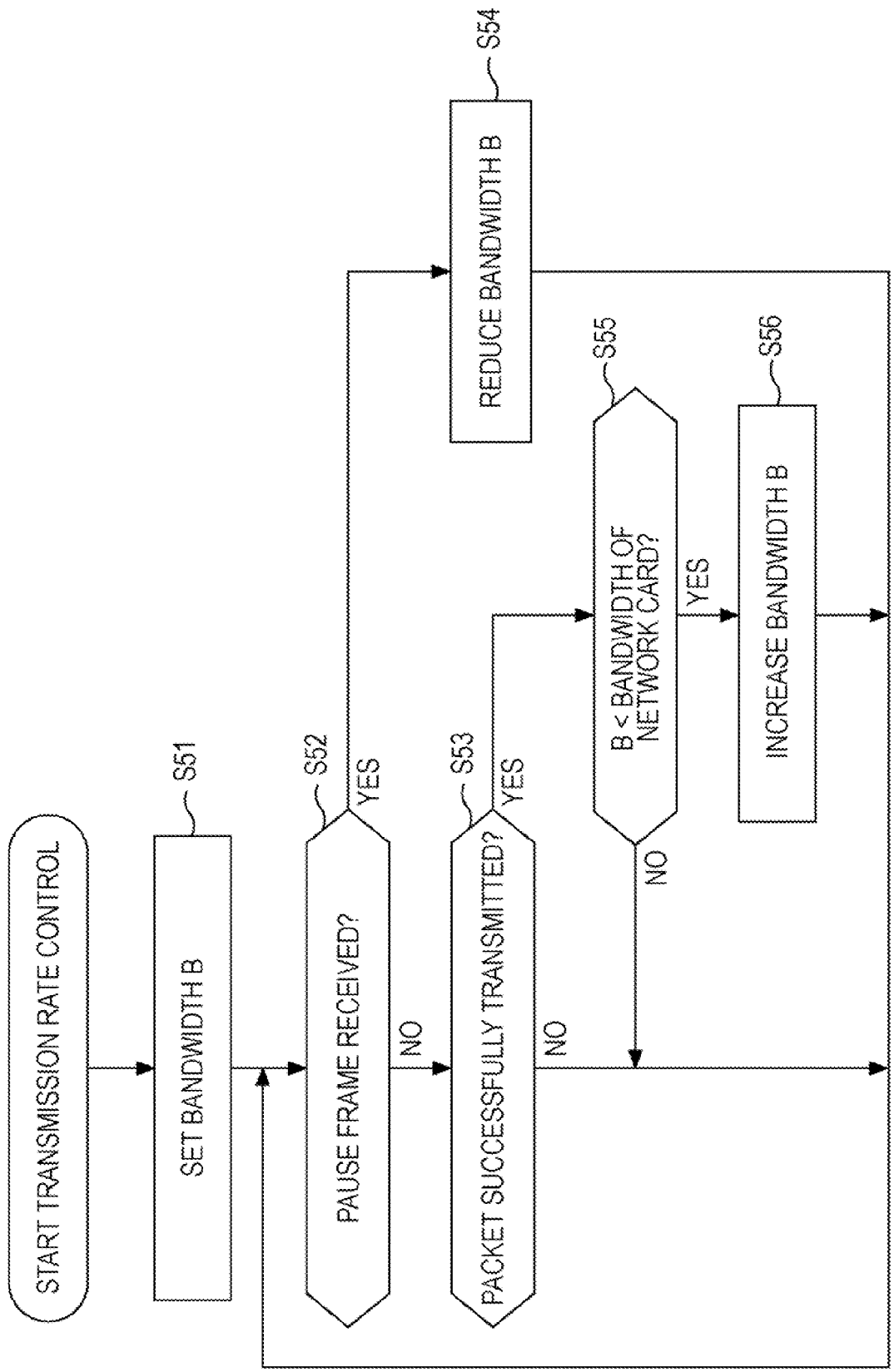
FIG. 9 is a flow chart illustrating a process of controlling a transmission rate.

FIG. 9 is a flow chart associated with the process performed by the transmission controller 151 to control the transmission rate of the network card 114.

In step S51, the transmission rate controller 162 sets a target bandwidth B corresponding to a transmission rate. For example, the transmission rate controller 162 sets the target bandwidth B to be equal to the bandwidth (for example, 10 Gbps) of the network card 114 (or the network 102).

In step S52, the transmission controller 151 determines whether the network card 114 has received a pause frame from the communication apparatus 103 at the receiving end via the network 102.

In the case where the determination in step S52 is that no pause frame has been received, the process proceeds to step S53. In step S53, the transmission controller 151 determines whether the network card 114 has successfully transmitted the packet to the communication apparatus 103 at the receiving end via the network 102.

In the case where the determination in step S53 is that the transmission of the packet is not successful, the processing flow returns to step S52 to repeat the above-described process.

On the other hand, in the case where the determination in step S53 is that the packet has been successfully transmitted, the process proceeds to step S55. In step S55, the transmission rate controller 162 determines whether the target bandwidth B is smaller than the bandwidth of the network card 114 (or the network 102).

In a case where it is determined in step S55 that the bandwidth of the network card 114 is 10 Gbps and the target bandwidth B is set to 10 Gbps, and thus the target bandwidth B is equal to or greater than the bandwidth of the network card 114, the processing flow returns to step S52 to repeat the above-described process from step S52. That is, when the communication apparatus 101 in a state in which no pause frame is received and packets have been successfully transmitted at a transmission rate (for example, 10 Gbps) corresponding to the bandwidth of the network card 114, transmission of packets to the communication apparatus 103 via the network 102 is continued at this transmission rate (for example, 10 Gbps).

Thereafter, if it is determined in step S52 that the network card 114 has received a pause frame from the communication apparatus 103 at the receiving end, then, in step S54, the transmission rate controller 162 reduces the target bandwidth B. More specifically, the transmission rate controller 162 reduces the target bandwidth B according to equation (2) shown below.

$$\text{target bandwidth } B = (\text{target bandwidth } B)/2 \quad (2)$$

More specifically, for example, when the target bandwidth B is set to be equal to the bandwidth (10 Gbps) of the network card 114, if a pause frame is received from the communication apparatus 103 at the receiving end, then the target bandwidth B is changed to (target bandwidth B)/2=10/2 Gbps=5 Gbps. Thus, when the communication apparatus 101 receives a pause frame from the communication apparatus 103 at the receiving end, the transmission rate at which packets are transmitted is reduced from 10 Gbps to 5 Gbps.

In the following process, if the determination is step S52 is that no pause frame is received and the determination in step S53 is that transmission of a packet is successful, then the process again proceeds to step S55. In step S55, the transmission rate controller 162 again determines whether the target bandwidth B is smaller than the bandwidth of the network card 114 (or the network 102).

If it is determined in step S55 that the target bandwidth B is smaller than the bandwidth of the network card 114, which can occur, for example, when the bandwidth of the network card 114 is 10 Gbps and the target bandwidth B is 5 Gbps, then, in step S56, the transmission rate controller 162 increases the target bandwidth B. More specifically, the transmission rate controller 162 increases the target bandwidth B according to equation (3) shown below.

$$\text{target bandwidth } B = \text{target bandwidth } B + 1 \text{ (Mbps)} \quad (3)$$

For example, in a case where the current target bandwidth B is 5 Gbps, the target bandwidth B is increased to 5 (Gbps)+1 (Mbps)=5.001 (Gbps). Thus, when the communication apparatus 101 receives no pause frame from the communication apparatus 103 at the receiving end, and transmission of a packet is successful, the target bandwidth B is increased in the allowable range lower than the bandwidth of the network card 114, such as to 5.001 (Gbps), then further 5.002 (Gbps), 5.003 (Gbps), and so on.

Thus, as long as the communication apparatus 101 is in a state in which no pause frame is received, and packets are transmitted successfully, transmission of packets to the communication apparatus 103 via the network 102 is continued while the transmission rate is increased step by step to 5.001 (Gbps), 5.002 (Gbps), 5.003 (Gbps), and so on.

In other words, the transmission rate controller 162 controls the transmission rate such that the transmission rate at which data is transmitted is increased when a period specified by a pause frame according to the IEEE802.3x standard has elapsed, or when a zero pause frame according to the IEEE802.3x standard transmitted from the communication apparatus 103 at the receiving end is received via the network 102.

As described above, in the communication apparatus 101, when no pause frame is received, the target bandwidth B is increased within the allowable range smaller than the bandwidth of the network card 114 (or the network 102). If a pause frame is received, the target bandwidth B is reduced. Thus, in the communication apparatus 101 at the transmitting end, the transmission rate corresponding to the target bandwidth B is controlled so as to match the processing power of the communication apparatus 103 at the receiving end.

In general, the transmission rate is controlled by an AIMD (Additive Increase Multiple Decrease) scheme such that increment in the bandwidth is performed by a small value at a time, but decrement is performed by a large value. Thus, in the present embodiment, increment in the bandwidth is performed such that 1 Mbps is added to the current target bandwidth B, while decrement is performed such that the target bandwidth B is reduced to one-half the current value. However, the incremental and decremental values are not limited to those employed in the present embodiment, but other values may be used, as long as the bandwidth is increased when a packet is successfully received by the apparatus at the receiving end, while the bandwidth is reduced when a pause frame is received.

The present applicant has proposed a technique of DMA transmission intervals in Japanese Unexamined Patent Application Publication No. 2006-293799. This technique of DMA transmission intervals may be applied to the present embodiment to adjust the transmission intervals at which data is read from the memory 113 and transmitted by the DMA scheme so as to prevent the transmission buffer 121 of the network card 114 from having an overflow. Thus, the control of the transfer rate of the data bus 112 using the technique of controlling the DMA transmission intervals is described below.

FIG. 10 is a flow chart illustrating the process performed by the transmission controller 151 to control the transfer rate of the data bus 112 using the technique of controlling the DMA transmission intervals.

In step S71, the transfer rate controller 161 sets the target bandwidth B. More specifically, for example, the transfer rate controller 161 sets the target bandwidth B to be equal to the bandwidth (for example, 10 Gbps) of the network card 114 (or the network 102).

In steps S72 and S73, as in steps S32 and S33 in FIG. 6, the transmission controller 151 makes a determination as to whether the memory 113 has data to be transmitted, and as to whether the transmission buffer 121 has a free storage space.

In step S74, the DMA controller 163 sets information associated with packets in the descriptor on the packet-by-packet basis.

More specifically, for example, the DMA controller 163 sets an address of the memory 113 assigned to the packet, information indicating the packet size, and information indicating the DMA interval in the descriptor of the network card 114 (or the memory 113).

For example, the DMA controller 163 calculates the DMA transfer interval according to equation (4) shown below.

$$\text{DMA transfer interval} = (\text{packet size})/(\text{target bandwidth } B) \quad (4)$$

For example, in a case where the network card 114 with a bandwidth of 10 Gbps continuously transmits packets with a size of 1,000 bytes, ((packet size)/(target bandwidth B)) is given as 1,000 (bytes)/10 (Gbps)=(8×1,000 (bits))/(10×1,000,000,000 (bits/sec))=8/10,000,000 (sec) =0.00000008=0.8 (μs). Thus, the DMA transfer interval is set to 0.8 μs.

The DMA controller 163 sets the data indicating that the DMA interval should be 0.8 (μs), together with the address of the memory 113 at which the corresponding packet is located and the size of the packet, in the descriptor of the network card 114.

Thus, in the network card 112, in accordance with the descriptor set by the CPU 111, data to be transmitted is transferred to the transmission buffer 121 on a packet-by-packet basis by the DMA scheme and stored in the transmission buffer 121. The data to be transmitted is transmitted in the form packets from the network card 114 to the communication apparatus 103 via the network 102.

In step S75, the DMA controller 163 determines whether the DMA transfer of packets from the memory 113 to the transmission buffer 121 of the network card 114 is completed.

In the case where the determination in step S75 is that the DMA transfer is not yet completed, the processing flow returns to step S75 to repeat the above-described process.

That is, while the DMA transfer of packet data from the memory 113 to the transmission buffer 121 of the network card 114 is being performed at the DMA intervals set in the descriptor, step S75 is performed repeatedly until it is determined that the DMA transfer is completed.

On the other hand, in the case where the determination in step S75 is that the DMA transfer is completed, the process returns to step S72 to repeat the process from step S72 to S75. In this repetition of the process, if the memory 113 has data to be transmitted supplied by the transmission application, and if the transmission buffer 121 has a free storage space, the DMA controller 163 sets the address indicating the location of a packet in the memory 113, the size of the packet, and the DMA interval in the descriptor, and the packet is transferred from the memory 113 to the buffer 121 by the DMA scheme.

In the communication apparatus 101, as described above, the transfer rate of the data bus 112 is controlled according to data specifying the delay time which should be applied to the DMA interval to prevent the transmission buffer 121 from having an overflow.

Next, referring to a timing chart shown in FIG. 11, explained are operations of the CPU 111, the memory 113, and the network card 114 during the transfer rate control process performed by the transmission controller 151 (i.e., the CPU 111) to control the transfer rate of the data bus 112 by controlling the DMA transfer interval described above with reference to FIG. 10.

In FIG. 11, as with FIG. 7, a timing chart of the CPU 111 (the transmission controller 151) is shown on the top, a timing chart of the memory 113 in the middle, and a timing chart of the network card 114 on the bottom. In each timing chart in FIG. 11, a horizontal solid line represents time elapsing in a direction from left to right in FIG. 7.

For example, in step S74 in FIG. 10, if the DMA controller 163 sets the address indicating the location of a packet in the memory 113, the size of the packet, and the DMA interval in the descriptor, the CPU 111 sets the descriptors $D_{21}$, $D_{22}$, and $D_{23}$ to $D_{2m}$ (where m is an integer (descriptor $D_{2m}$ is not shown in the figure)) in the network card 114 via the data bus 112 as shown in FIG. 11.

That is, in the descriptors $D_{21}$, $D_{22}$, and $D_{23}$ to $D_{2m}$, addresses indicating locations of corresponding packets in the memory 113, sizes of packets, and the DMA interval are described in the descriptors.

If the DMA interval described in the descriptor $D_{21}$ has elapsed, then, in accordance with the packet address and the packet size described in the descriptor $D_{21}$, the network card 114 transfers data having the packet length specified in the descriptor $D_{21}$ starting from the start address specified in the descriptor $D_{21}$ from the memory 113 to the transmission buffer 121 by the DMA scheme. The network card 114 further transmits the received packet to the communication apparatus 103 via the network 102.

Thereafter, if the DMA interval described in the descriptor $D_{22}$ has further elapsed, then, in accordance with the packet address and the packet size described in the descriptor $D_{22}$, the network card 114 transfers data having the packet length specified in the descriptor $D_{22}$ starting from the start address specified in the descriptor $D_{22}$ from the memory 113 to the transmission buffer 121 by the DMA scheme, and further transmits the packet to the communication apparatus 103 via the network 102.

Similarly, in the operation in each of the following DMA intervals described in the descriptors $D_{23}$ to $D_{2m}$, if the DMA interval described in the descriptor has elapsed, the network card 114 transfers data having the packet length specified in the descriptor starting from the start address specified in the descriptor from the memory 113 to the transmission buffer 121 by the DMA scheme, and further transmits the packet to the communication apparatus 103 via the network 102.

As described above, the CPU 111 (the transmission controller 151) adjusts the DMA interval set in the descriptor by performing the software process, and the hardware operates in accordance with the specified DMA interval whereby the DMA transfer between the memory 113 and the transmission buffer 121 of the network card 114 is performed at the adjusted DMA interval. Thus, in the communication apparatus 101, the transfer rate of the data bus 112 is controlled in the above-described manner to prevent the transmission buffer 121 from having an overflow.

As described above, in the communication apparatus according to the present embodiment, the transmission buffer disposed in the network card is prevented from having an overflow without imposing a large processing load on the CPU. That is, in the present embodiment, it is not necessary to detect whether a free storage space is created in the transmission buffer by receiving a notification interrupt from the network card 14 or by checking the status of the network card 14 by polling, and thus it is possible to simplify the DMA processing program and reduce the processing load imposed on the CPU.

Besides, in the communication apparatus at the receiving end, it is possible to reduce the processing load in the packet receiving process. Furthermore, it is not necessary to issue a pause frame, and thus the flow control process can be very simplified.

In the embodiments described above, for ease of understanding, it is assumed that the CPU 111 sets the descriptor in the network card 114. Alternatively, the CPU 111 may set the descriptor in the memory 113.

In the present description, the steps described in the program stored in the storage medium may be performed either in time sequence in accordance with the order described in the program or in a parallel or separate fashion.

It should be understood by those skilled in the art that various modifications, combinations, sub-combinations and alterations may occur depending on design requirements and other factors insofar as they are within the scope of the appended claims or the equivalents thereof.

What is claimed is:

1. A transmission apparatus, comprising:
   a memory storing transmittable data;
   a transmission means for transmitting, via a network, at least a portion of the transmittable data to a destination apparatus connected to the network, the transmission means comprising a transmission buffer;
   a bus disposed between the memory and the transmission means; and
   a first rate control means for controlling a first rate of data transmission between the memory and the transmission buffer, the first rate control means being configured to:
      establish a value of a target bandwidth of a first data transmission between the memory and the transmission buffer;
      determine whether a value of a first bandwidth of the bus is greater than a value of a second bandwidth of a connection between the transmission means and the network;
      decrease the target bandwidth value, when the first bandwidth value is greater than the second bandwidth value;
      determine whether a packet size of the first data transmission exceeds a capacity of the transmission buffer; and
      compute a transfer interval for the first data transmission at the target bandwidth value, when the packet size does not exceed the capacity of the transmission buffer.

2. The transmission apparatus of claim 1, wherein the transmittable data portion is transferred from the memory to the transmission buffer by a DMA (Direct Memory Access) scheme.

3. The transmission apparatus of claim 1, further comprising second rate control means for controlling a second rate of data transmission between the transmission means and the network, wherein the second rate control means is configured to:
   receive, via the network, a notification indicating that a reception buffer of the destination apparatus has an overflow;
   decrease the second bandwidth value, in response to the received notification.

4. The transmission apparatus of claim 3, wherein the notification is a pause frame.

5. The transmission apparatus of claim 4, wherein the second rate control means is further configured to:
   determine whether a period specified by the pause frame has elapsed; and
   increase in the second bandwidth value, when the period specified by the pause frame has elapsed.

6. The transmission apparatus of claim 5, wherein the second rate control means is further configured to increase the second value according to an AIMD (Additive Increase Multiple Decrease) scheme.

7. The transmission apparatus of claim 2, wherein the first rate control means controls the first rate by controlling a transfer interval of the DMA scheme.

8. A method of transmitting data, comprising:
   storing transmittable data within a memory;
   transmitting, via a network, at least a portion of the transmittable data to a destination apparatus connected to the network; and
   controlling a first rate of data transmission between the memory and a transmission buffer of a transmission unit the controlling comprising:
      establishing a value of a target bandwidth of a first data transmission between the memory and the transmission buffer;
      determining whether a value of a first bandwidth of a bus disposed between the memory and the transmission unit is greater than a value of a second bandwidth of a connection between the transmission unit and the network;
      decreasing the target bandwidth value, when the first bandwidth value is greater than the second bandwidth value;
      determining whether a packet size of the first data transmission exceeds a capacity of the transmission buffer; and
      computing a transfer interval for the first data transmission at the target bandwidth value, when the packet size does not exceed the capacity of the transmission buffer.

9. A non-transitory, computer-readable medium storing a program that, when executed by a processor, causes the processor to perform a method for transmitting data, the method comprising:
   storing transmittable data within a memory;
   transmitting, via a network, at least a portion of the transmittable data to a destination apparatus connected to the network; and controlling a first rate of data transmission between the memory and a transmission buffer of a transmission unit the controlling comprising:
    establishing a value of a target bandwidth of a first data transmission between the memory and the transmission buffer;
    determining whether a value of a first bandwidth of a bus disposed between the memory and the transmission unit is greater than a value of a second bandwidth of a connection between the transmission unit and the network;
    decreasing the target bandwidth value, when the first bandwidth value is greater than the second bandwidth value;
    determining whether a packet size of the first data transmission exceeds a capacity of the transmission buffer; and
    computing a transfer interval for the first data transmission at the target bandwidth value, when the packet size does not exceed the capacity of the transmission buffer.

10. A communication apparatus comprising:
a memory storing transmittable data;
a transmission unit for transmitting, via a network, at least a portion of the transmittable data to a destination apparatus connected to the network, the transmission unit comprising a transmission buffer;
a bus disposed between the memory and the transmission unit; and
a first rate control unit for controlling a first rate of data transmission between the memory and the transmission buffer, the first rate control unit being configured to:
    establish a value of a target bandwidth of a first data transmission between the memory and the transmission buffer;
    determine whether a value of a first bandwidth of the bus is greater than a value of a second bandwidth of a connection between the transmission unit and the network;
    decrease the target bandwidth value, when the first bandwidth value is greater than the second bandwidth value;
    determine whether a packet size of the first data transmission exceeds a capacity of the transmission buffer; and
    compute a transfer interval for the first data transmission at the target bandwidth value, when the packet size does not exceed the capacity of the transmission buffer; and
reception unit for receiving data transmitted from an apparatus via a network.

11. A transmission apparatus, comprising:
a memory storing transmittable data;
a transmission unit for transmitting, via a network, at least a portion of the transmittable data to a destination apparatus connected to the network, the transmission unit comprising a transmission buffer;
a bus disposed between the memory and the transmission unit; and
a first rate controller for controlling a first rate of data transmission between the memory and the transmission buffer, the first rate controller being configured to:
    establish a value of a target bandwidth of a first data transmission between the memory and the transmission buffer;
    determine whether a value of a first bandwidth of the bus is greater than a value of a second bandwidth of a connection between the transmission unit and the network;
    decrease the target bandwidth value, when the first bandwidth value is greater than the second bandwidth value;
    determine whether a packet size of the first data transmission exceeds a capacity of the transmission buffer; and
    compute a transfer interval for the first data transmission at the target bandwidth value, when the packet size does not exceed the capacity of the transmission buffer.

12. The transmission apparatus of claim 4, wherein the second rate control unit is further configured to:
    receive a release frame via the network, the release frame indicating a release of a pause state of the pause frame; and
    increasing the second bandwidth value, upon receipt of the release frame.

13. The method of claim 8, wherein the transmitting comprises transferring the transmittable data portion from the memory to the transmission buffer by a DMA (Direct Memory Access) scheme.

14. The method of claim 8, wherein the controlling further comprises:
    determining whether a value of a first bandwidth of a bus connecting the memory and the transmission unit is greater than a value of a second bandwidth of a connection between the transmission unit and the network; and
    decreasing the target bandwidth value, when the first bandwidth value is greater than the second bandwidth value.

15. The method of claim 14, further comprising controlling a second rate of data transmission between the transmission unit and the network, wherein controlling the second rate comprises:
    receiving, via the network, a notification indicating that a reception buffer of the destination apparatus has an overflow;
    decreasing the second bandwidth value, in response to the received notification.

16. The method of claim 15, wherein:
the notification comprises a pause frame; and
controlling the second rate further comprises:
    determining whether a period specified by the pause frame has elapsed; and
    increasing the second bandwidth value, when the period specified by the pause frame has elapsed.

17. The method of claim 16, wherein increasing the second bandwidth value comprises increasing the second bandwidth value according to an AIMD (Additive Increase Multiple Decrease) scheme.

18. The method of claim 13, wherein controlling the second rate further comprises:
    receiving a release frame via the network, the release frame indicating a release of a pause state of the pause frame; and
    increasing in the second bandwidth value, upon receipt of the release frame.

19. The method of claim 13, wherein the controlling comprises controlling a transfer interval of the DMA scheme.

* * * * *